United States Patent [19]

Meier et al.

[11] 4,076,626
[45] Feb. 28, 1978

[54] HIGH STRENGTH CAST MODULES FOR SUPPORTING REVERSE OSMOSIS MEMBRANES

[75] Inventors: Joseph F. Meier, Export; James D. B. Smith, Wilkins Township, Allegheny County, both of Pa.

[73] Assignee: Union Carbide Corporation, New York, N.Y.

[21] Appl. No.: 650,357

[22] Filed: Jan. 19, 1976

[51] Int. Cl.² .............................................. B01D 31/00
[52] U.S. Cl. .................. 210/496; 210/500 M; 210/433 M; 260/2.5 EP; 260/37 EP; 427/244; 427/245
[58] Field of Search ......... 210/321 R, 433 M, 500 M, 210/496; 260/37 EP, 2.5 EP; 427/244, 245, 246

[56] References Cited

U.S. PATENT DOCUMENTS

| | | | |
|---|---|---|---|
| 3,470,132 | 9/1969 | Ernst et al. | 260/37 EP X |
| 3,598,241 | 8/1971 | Vondracek et al. | 210/321 R |
| 3,610,418 | 10/1971 | Calderwood | 210/321 R |
| 3,686,174 | 8/1972 | Allschwil et al. | 260/37 EP X |
| 3,689,444 | 9/1972 | Wolfe | 260/37 EP X |
| 3,796,314 | 3/1974 | Kolek | 210/496 X |

*Primary Examiner*—Frank A. Spear, Jr.
*Attorney, Agent, or Firm*—William Raymond Moran

[57] ABSTRACT

A rigid, hollow, porous, strongly consolidated reverse osmosis membrane support module having a wall containing bonded, resin coated filler particles, wherein the inside of said wall supports a reverse osmosis membrane, is made by: (A) forming a 100 percent solids, solventless, latent catalyzed resin composition consisting essentially of an admixture of liquid epoxy resin, liquid organic acid anhydride curing agent, liquid diepoxide reactive diluent and quaternary ammonium, phosphonium or arsonium salt latent catalyst; the solventless resin composition having a viscosity of below about 100 cp. at 25° C, (B) mixing the solventless resin composition with a quantity of filler particles, so that the filler is coated with resin, and the resin constitutes about 1 to 18 percent of the resin coated filler weight, (C) casting the resin coated filler particles into a mold, the mold having a configuration effective to provide a cast structure having at least one interior axial bore therethrough, (D) heating the mold containing the cast, contacting, resin coated filler particles, to cure the resin and bond adjacent resin coated filler particles together, (E) cooling the mold and removing the cast structure, to provide a strongly consolidated module, having at least one bore therethrough, and (F) casting a reverse osmosis membrane in the interior axial bores of the module.

10 Claims, 2 Drawing Figures

U.S. Patent  Feb. 28, 1978  4,076,626

HIGH STRENGTH CAST MODULES FOR SUPPORTING REVERSE OSMOSIS MEMBRANES

BACKGROUND OF THE INVENTION

This invention relates to porous, hollow vessels and to methods of manufacturing them. More particularly, this invention relates to an open pore tube made of bonded, resin coated filler particles, which serves as a support tube for cellulose acetate or other types of reverse osmosis membranes.

The major advantage of reverse osmosis as a saline or contaminated water purification process is the low-energy requirements as compared to other processes. The function of a cell for the reverse osmosis process is to bring a saline or contaminated water solution at high pressure into contact with a supported semipermeable membrane.

There are several metals and metal combinations which can be used for the tubular-type membrane support and pressure containing components in a reverse osmosis system. These supports include clad carbon steels with alloys of copper and nickel or stainless steels as the cladding material. These supports easily conform to the pressure requirements of such a system but the initial material cost is very expensive. Such tubular supports must be drilled with holes to permit the pure water to be removed from a saturable medium such as a fabric that is would around the membrane, forming a sump between the support and the membrane. This also adds to fabrication costs.

Porous fiberglass components have been used in reverse osmosis pilot plant operations successfully. Such components while strong and resistant to corrosion are, however, relatively expensive and require elaborate production equipment.

Vondracek in U.S. Pat. No. 3,598,241, taught the use of bonded, resin coated filler particles as a porous, tubular-type membrane support module. The phenolic support modules of that invention, however, have a tendency to occasionally develop stress cracks during curing, and generally require a metal tube surrounding the sand casting as an additional support during operation.

These stress and support problems were solved by Kolek, in U.S. Pat. No. 3,796,314, where an organo silane was used in the resin composition to provide improved tensile and compressive strength properties. Kolek's epoxy compositions, containing silanes and solvents, provided castings having dry compressive strengths and between about 2,400 psi. to 3,460 psi.; vs. about 1,200 psi. to 1,400 psi. dry compressive strengths, and 400 psi. to 800 psi. wet burst strengths for module castings containing the phenolic compositions without salines taught by Vondracek. The Kolek resin formulation did not, however, have a very long shelf life. In addition, the use of solvents presented some problems of solvent entrapment, voids and cracks. And so, there is a need for even better formulations which will impart higher dry compressive and wet burst strengths to reverse osmosis membrane support module castings.

SUMMARY OF THE INVENTION

The above problems of resin formulation shelf life and improved dry compressive and wet burst strengths are solved by using a low viscosity, 100 percent solids, solventless, latent catalyzed resin formulation, consisting essentially of: an admixture of a liquid epoxy resin, a liquid organic acid anhydride curing agent, a liquid diepoxide reactive diluent and a quaternary ammonium, phosphonium or arsonium salt latent catalyst, as a filler coating. The resin formulation is then used in casting a quantity filler particles and casting the coated filler. This provides, upon cure, a rigid hollow open pore strongly consolidated body, which is generally made in tubular form. This tube is especially strongly consolidated and suitable as a reverse osmosis membrane support having improved strength properties, i.e. wet burst strengths of at least 750 psi.

BRIEF DESCRIPTION OF THE DRAWINGS

For a better understanding of the invention, reference may be made to the preferred embodiments, exemplary of the invention shown in the accompaying drawings in which.

DESCRIPTION OF THE PREFERRED EMBODIMENTS

Osmosis occurs when two solutions of different concentrations in the same solvent are separated from one another by a membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis", "pressure osmosis" and "hyperfiltration" are used to describe this process.

Figure 1:
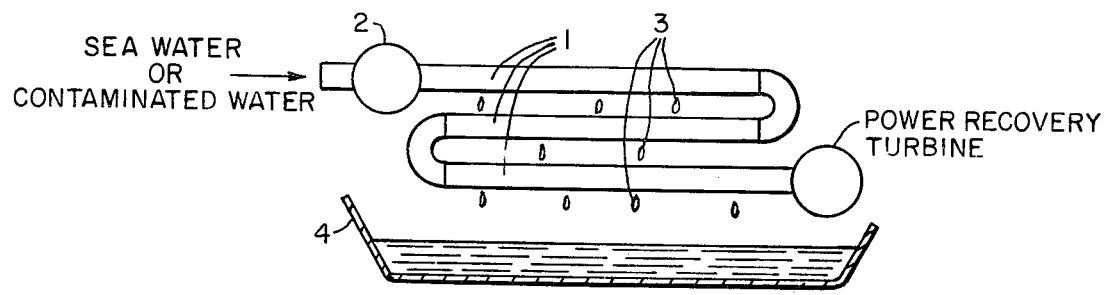
FIG. 1 is a diagram showing the principle of extracting fresh water from sea or contaminated water by a reverse osmosis liquid treatment system containing a supported membrane, feed inlet means and treated liquid outlet means.

FIG. 1 illustrates a typical tubular-type reverse osmosis liquid treatment system. Sea water or contaminated water is pumped through a battery of support tubes 1 to contact a semipermeable membrane. The pump 2 must exert a pressure of at least 10 psi. and can operate at high as 1,000 psi. to 1,500 psi. Generally, the tubes must have burst strengths of at least 750 psi. The tubes can be mounted in batteries of about 150 each. They serve to support the reverse osmosis membrane contained within the tube wall. The membrane is usually made of an ether or ester cellulosic derivative. Generally, modified cellulose acetate is used, and reference can be made to U.S. Pat. Nos. 3,170,867; 3,310,488; 3,344,214; 3,446,359 and 3,593,855 for detailed information concerning these materials and their method of manufacture.

Other suitable membranes can include those made from polyamic acid salts and pyrrone polymer precursors, as described in U.S. Pat. Nos. 3,835,207 and 3,817,386 respectively. These membranes can be drop cast or pressure cast, as taught by U.S. Pat. Nos. 3,657,402 and 3,658,955 respectively. In one process of casting from a modified cellulose acetate solution, the module is placed in a stationary vertical position and the viscous membrane casting solution is placed into each of the interior support module bores. Then a casting bob having a circular cross-section is gravity dropped down the bore to form a continuous film of membrane casting solution on the inside of each bore. The film is then exposed to air and finally contacted with a leaching

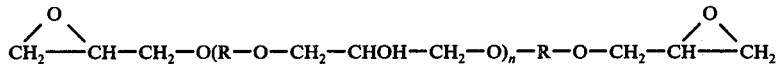

liquid, generally cold water, to form a reverse osmosis membrane on the inside of each module bore.

The tube walls that support the reverse osmosis membranes must be highly consolidated, i.e. have sufficient burst and compressive strength to be able to withstand the pressure, generally 500 psi. to 750 psi., exerted on them by the pump, which is used as the means to introduce the feed liquid. The module must also be able to allow egress of the pure treated water 3 into a collecting pan 4. For sea water several passes through a system of this type may be required before the water is usable.

Figure 2:
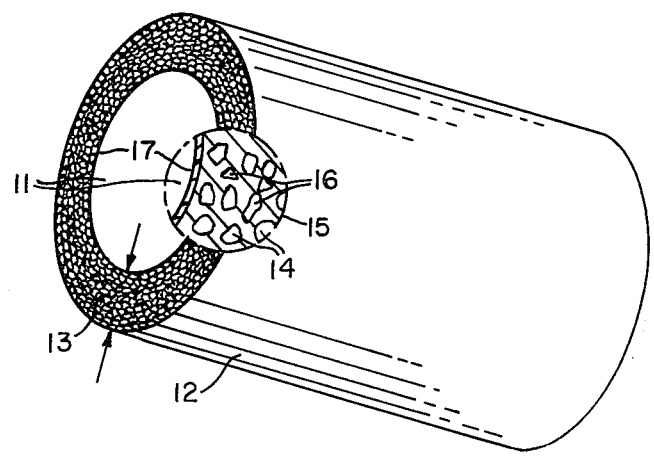
FIG. 2 is a three dimensional cross-sectional view of one embodiment of the reverse osmosis support tube of this invention, showing the membrane supported by the inside tube walls.

FIG. 2 shows one embodiment of this invention wherein the rigid, hollow tube support 10 contains feed water interior axial bore 11. Since the tube is made by casting techniques there is no limit to tube design. The tube wall 12 of thickness 13 comprises contacting bonded filler 14 coated with an organic resin film 15, which bonds the filler together.

A solventless, 100% reactive mixture, containing epoxy resin, anhydride curing agent, reactive diluent, and an effective amount of latent catalyst is coated onto the filler particles in such a way as to leave a thin, uncured film on each filler particle. Preferably, a highly wettable, low viscosity composition is used. The resulting resin coated filler is relatively free flowing and is cast or blown into a mold of the desired configuration. The mold will have a design or configuration that is effective to provide a module casting having at least one axial bore therethrough. Generally, one or more removable mandrels are used in the molds. The mold is then heated to cure the resin. The mold is then cooled and the cast module is removed.

The curing process transforms the filler-solventless resin composition into a strongly consolidated, rigid, hollow, porous module of bonded resin coated filler particles. The use of solventless resins eliminates problems of solvent entrapment. This tube 10 contains voids or pores 16 between the resin coated filler particles, allowing egress of the pure water which has passed through the semipermeable reverse osmosis membrane 17 supported by the inside of the tube walls. The area and number of the voids will vary inversely with the amount of resin that is coated onto the filler particles.

On curing, the thin film of resin bonds each filler particle to the adjacent particles. It is readily seen that the amount of resin used, the size of the filler particles and the wall thickness can be adjusted to give a considerable range in the strength and porosity of the resultant tube. However, for any given filler-resin tube the stength increases with increasing resin content and the porosity decreases.

Epoxy resins are preferred as the primary bonding agent as they provide the best overall strength properties. One type of epoxy resin that can be used in this invention is a glycidyl polyether of a dihydric phenol, obtainable by reacting epichlorohydrin with a dihydric phenol in an alkaline medium at about 50° C using 1 to 2 or more mols of epichlorohydrin per mol of dihydric phenol. The heating is continued for several hours to effect the reaction and the product is then washed free of salt and base. The product, instead of being a single compound, is generally a complex mixture of glycidyl polyethers, but the principal product may be represented by the structural formula:

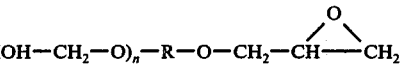

where $n$ is an integer of the series 0, 1, 2, 3, ..., and R represents the divalent hydrocarbon radical of the dihydric phenol. Typically R is:

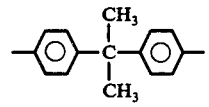

These glycidyl polyethers are commonly called bis-phenol A type (D.G.B.A.) epoxy resins. Bis-phenol A (p,p-dihydroxy-diphenyl-dimethyl methane) is the dihydric phenol used in these epoxides. The glycidyl polyethers of a dihydric phenol used in the invention have a 1,2 epoxy equivalency between 1.0 and 2.0. By the epoxy equivalency, reference is made to the average number of 1,2 epoxy groups,

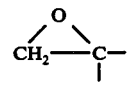

contained in the average molecule of the glycidylether.

Typical epoxy resins of bis-phenol A are readily to the Handbook of Epoxy Resins by Lee and Neville for a complete description of their synthesis or to U.S. Patent Nos. 2,324,483; 2,444,333; 2,500,600; 2,511,913; 2,558,949; 2,582,985; 2,615,007; and 2,663,458.

The glycidyl ether epoxy resins may also be characterized by reference to their epoxy equivalent weight, which is the means molecular weight of the particular resin divided by the mean number of epoxy radicals per molecule. In the present invention, the suitable bis-phenol A type epoxy resins are characterized by an epoxy equivalent weight of from about 150 to about 2,500 with a preferred range of about 160 to about 1,200.

Non-glycidyl ether epoxy resins, such as cycloaliphatic and acyclic aliphatic type epoxy resins, may also be used as the primary epoxy resin in place of or in combination with bis-phenol A type epoxy resins in this invention. These non-glycidyl ether epoxy resins are generally prepared by epoxidizing unsaturated aliphatic or unsaturated aromatic hydrocarbon compounds, such as olefins and cyclo-olefins, using hydrogen peroxide or peracids such as peracetic acid and perbenzoic acid:

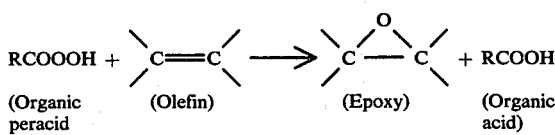

| RCOOOH + | C=C | → | C—C | + RCOOH |
| (Organic peracid) | (Olefin) | | (Epoxy) | (Organic acid) |

The organic peracids are generally prepared by reacting hydrogen peroxide with either carboxylic acids, acid chlorides or ketones to give the compound R—COOOH.

Such non-glycidyl ether epoxy resins are characterized by the absence of the ether oxygen near to the epoxide group and are selected from those which contain a carbon ring structure as well as an epoxy group in the molecule, the cycloaliphatic epoxy resins; and those which have an essentially linear carbon structure onto which are attached epoxy groups, the acyclic aliphatic epoxy resins.

Examples of cycloaliphatic epoxy resins would include 3,4-epoxycyclohexymethyl-3,4,-epoxy cyclohexane carboxylate; vinyl cyclohexane dioxide; 3,4-epoxy-6-methycyclohexyl methyl-3,4-epoxy-6-methylcyclohexane carboxylate and dicyclopentadiene dioxide. The cycloaliphatic epoxy resins are normally produced by the peroxidation of cyclic olefins. A distinguishing feature of many of the non-glycidyl ether cycloaliphatic epoxy resins is the location of epoxy group(s) on a ring structure rather than on an aliphatic side chain.

Examples of acyclic aliphatic epoxy resins would include epoxidized diene polymers, epoxidized polyesters and epoxidized naturally occurring fatty acid oils.

These non-glycidyl ether cycloaliphatic and acyclic aliphatic epoxy resins may be characterized by reference to their epoxy equivalent weight, which is defined as the weight of epoxide in grams which contains one gram equivalent of epoxy. In the present invention, these epoxy resins are characterized by an epoxy equivalent weight of from about 75 to 250 for the cycloaliphatic type, and from about 250 to 600 for the acyclic aliphatic type.

Other useful epoxy resins include hydantoin ring epoxy resins where the ring structure contains N constituents. These heterocyclic glycidyl amine epoxy resins are generally prepared by reaction of a five membered hydantoin ring with an epichlorohydrin to form a compound represented by the structural formula:

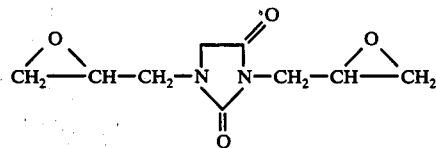

The hydantoin ring

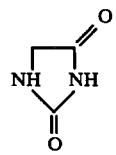

is readily synthesized from ketones, hydrogen cyanide, ammonia, carbon dioxide and water. These hydantoin ring epoxy resins are characterized by an epoxy equivalent weight of from about 110 to 180.

Other types of primary epoxy resins useful in this invention are epoxy resins derived from acid groups in an epichlorohydrin reaction. These are the glycidyl esters. Generally, they involve reaction of epichlorohydrin with a mono or poly carboxylic acid or the sodium or potassium salt of the acid. An alternative procedure is to react glycidol with acid chlorides. Most commonly, the carboxyl group is reacted directly in the presence of some catalyst other than sodium hydroxide, dehydrohalogenation being accomplished after completion of the initial reaction. These glycidyl ester resins are well known in the art and reference may be made to the Handbook of Epoxy Resins, pp. 2–18, for their synthesis and complete description.

The particular glycidyl esters employed as the resin ingredient in the invention are non-glycidyl ether epoxy resins containing more than 1,2 epoxy group per molecule. They are characterized by substitution of the ester bond

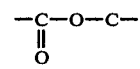

for the ether bond —O— and have the chemical structural formula:

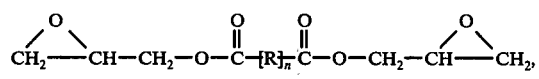

where R is an organic radical substituent selected from the group consisting of R', R'—O—R', R'—COO—R' and mixtures thereof, where R' is selected from the group consisting of alkylene groups, having from about 1–8 carbon atoms, saturated cycloalkylene groups where the ring has 4 to 7 carbons and mixtures thereof, where n is from about 1–8. These epoxy ester resins are characterized by an epoxy equivalent weight of from about 150 to 350. All of the above described useful primary epoxy resins must be in liquid form in order to provide a highly wettable low viscosity resin formulation, and each type may be used alone or in combination.

The liquid, organic acid anhydrides which are used as epoxy resin curing agents in carrying out the invention, include 1-methyl hexahydrophthalic anyhydride, 1-methyltetrahydrophthalic anhydride, NADIC anhydride, NADIC methyl anhydride, and the like liquid anhydrides; and blends of hexahydrophthalic anhydride, tetrahydrophthalic anhydride, phthalic anhydride, pyromellitic dianhydride, polyazelaic polyanhydride, the reaction product of trimellitic anhydride and a glycol, and benzophenone tetracarboxylic acid dianhydride solids with any of the above liquid anhydrides, to provide a liquid admixture of anhydrides. The anhydrides may be used singly or in admixture but the resultant material must be a liquid.

The total anhydride content of the epoxy-anhydride mixture must lie within the range of from about 0.5 to about 1.5 anhydride equivalents for each epoxy equivalent contained in the primary epoxy resin and the diepoxide reactive diluent. The anhydride is essential to provide a polar resin formulation that will easily wet the filler particles used in the reverse osmosis membrane support module. The anhydride will also impart excellent tensile strength to the module when reacted with epoxy resin.

Neopentyl diglycidylether, which is the preferred liquid diepoxide reactive diluent, is prepared by a two step process. The initial step reacts the neopentyl glycol (2,2-Dimethyl-1,3-propanediol) and epichlorohydrin in the presence of a Lewis acid, BF$_3$, to produce the chlorohydrid intermediate. This intermediate is then dehydrohalogenated by sodium hydroxide or sodium aluminate:

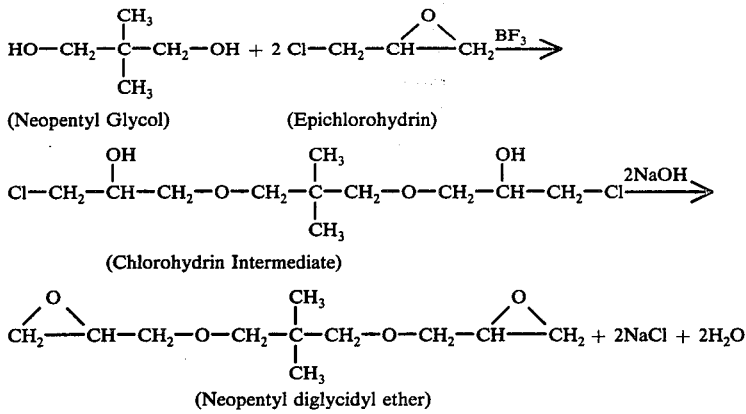

(Neopentyl diglycidyl ether)

This provides an extremely low viscosity resinous product. The diepoxide reactive diluent helps appreciably in allowing the resin formulation to easily wet the filler particles used in the reverse osmosis membrane support module. This aliphatic diepoxide is an excellent non-deleterious reactive diluent. Any other liquid diepoxide having a viscosity of between about 2 cp. to about 50 cp. at 27° C, and an epoxy equivalent weight of between about 100 and 250, and which is effective to react and dilute the primary epoxy resin can be used. Examples of other useful liquid diepoxide reactive diluents would include the diglycidyl ether of 1,4 butanediol and the diglycidyl ether of ethylene glycol.

The last essential component of the resin formulation of this invention is the quaternary ammonium, phosphonium or arsonium salt latent catalyst. The quaternary onium salt is a compound having the general structural formula:

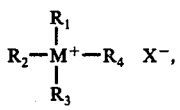

where $R_1$, $R_2$, $R_3$ and $R_4$ are aryl radicals or alkyl radicals having 1 to 21 carbon atoms with preferred alkyl radicals having 4 to 12 carbons and M is nitrogen, phosphorus, or arsenic. X, bonded to the nitrogen, phosphorus, or arsenic is a propionate, acetate, butyrate, isobutyrate, dimethylphosphate or halide radical. Phosphonium salts are preferred.

Examples of particularly suitable quaternary phosphonium salts which can be used alone or in admixtures would include, for example, benzyltrimethyl ammonium chloride, benzyltriethyl ammonium iodide, tetrabutyl phosphonium acetate, tetramethyl phosphonium chloride, methyltrioctyl phosphonium dimethylphosphate, methyltributyl phosphonium dimethylphosphate, methyltriphenyl phosphonium dimethylphosphate, and tetramethyl phosphonium propionate, tetrabutyl arsonium chloride, triphenyl arsonium iodide and tetraphenyl arsonium chloride.

These onium salts have the ability to speed up curing rates at elevated tempertures, i.e. over about 100° C, while exhibiting little or no cure at room temperature, thus giving good storage properties to the resin formulation of this invention. They are added in amounts effective to provide such latent catalyst activity. The onium salts are well known for their latent catalytic activity and reference may be made to U.S. Pat. Nos. 3,547,885 and 3,792,011, herein incorporated by reference for details on their preparation.

To provide a resin formulation having useful properties of high polarity, good filler particle wetting, low viscosity, long shelf life and superior dry compressive strength and wet burst strength upon curing, the above described components must be admixed within critical weight ratios. The ratios are: for each 1 part of liquid primary epoxy resin are added, about 0.75 to 1.55 parts of liquid, organic acid anhydride curing agent, about 0.25 to 0.95 part of liquid diepoxide reactive diluent and an effective amount, generally about 0.0001 to 0.0025 part, of quaternary onium salt, preferably a quaternary phosphonium salt latent catalyst.

This resin formulation is solventless, contains 100% solids, and should have a viscosity below about 100 cp. at 25° C. The resin formulation will have a useful shelf life, i.e. remain at a viscosity below about 1,000 cp. at 25° C for at least 60 days before becoming too viscous to give satisfactory wetting, i.e. forming a semi-solid gel. This latter property would be particularly important in commercial fabrication of the reverse osmosis membrane support modules. This resin formulation does not require inclusion of organo silane to provide good strength properties upon curing. However, an exterior tubular support of perforated metal or resin coated fabric can be used to provide an extremely high strength module.

The finely divided filler used in accordance with this invention may be spherical, oval, cubical, or of other irregular configuration. Some examples of suitable inorganic filler particles are sand, zircon, quartz, beryl, talc, glass, limestone, calcium silicate, alumina, or any other filler with granular structure. Lightweight fillers such as hollow spherical glass beads, vermiculite, expanded perlite, and ground pumice stone can also be used. The preferred average particle size range is between 50 to 250 microns although the outer limits are between about 40 and 500 microns. Below 40 microns the resin-filler support tube lacks the desired porosity for low resistance to water flow and above 500 microns the tube does not properly support the membrane.

The weight percent resin composition, i.e. primary epoxy, diepoxide diluent, anhydride and latent catalyst, that can be used in this invention will vary from about 1 to 18 weight percent of the coated filler particle weight. When sand is used as the filler the range will vary from about 2 to 10 weight percent of the resin sand casting composition. On a volume basis the range would be about 4 to 32 percent resin for the fillers enumerated. Above these ranges the resin will tend to clog up the pores between the filler particles in the tube causing poor effusion of the pure water. Below these ranges the support tube will not be strong enough for the pressures required in this water purification process.

Other materials that may be used in the resin formulation include effective amounts of waxes, such as, for example, Montan wax, Bisamide wax or release agents such as, for example calcium stearate, to provide a smooth surface finish and good release of the sand casting from its production mold.

EXAMPLE 1

To about 2,550 grams of dry, white sand having an average particle size of about 300 microns (U.S. Sieve Size Screen No. 50) was added 205.5 grams of a 100% solids, solventless epoxy resin formulation having a viscosity of 70 cp. at 25° C and a shelf life of about 60 days at 25° C. The epoxy resin formulation contained 50 grams of a pure liquid diglycidyl ether of bis-phenol A, having a viscosity of between 4,000 and 5,500 cp. at 25° C and an epoxy equivalent weight of 172 to 176 (sold commercially by Dow Chemical Co. under the Tradename DER 332); 105 grams of 1-methyltetrahydrophthalic liquid organic anhydride curing agent; 50 grams of liquid neopentyl diglycidyl ether, having a viscosity of about 4 cp. at 27° C and an epoxy equivalent weight of about 150; and 0.5 gram of liquid methyltributyl phosphonium dimethylphosphate as latent catalyst. This provided about 7.4 wt.% resin, based on total resin plus filler.

The sand filler and above described epoxy resin formulation were mixed in a Hobart type mixer for about 5 minutes until the resin sand casting composition was free flowing. The resin sand casting composition was then poured into a 12 inches long, 1½ inches inside diameter cylindrical tube, which had been sprayed with calcium stearate mold release agent. A ⅛ inch Teflon coated mandrel was centrally mounted within the tube. The filled tube was then heated at atmospheric pressure for about 8 hours at 160° C to cure the composition. The tube was then stripped and the mandrel removed to provide a rigid, highly consolidated, porous, cast module of epoxy resin coated sand particles containing one axial hole. It contained about 7.4 wt.% resin. A variety of solid cylinders were also cast from this composition for dry compressive testing purposes using the same curing schedule.

Tubular porous reverse osmosis membranes made from a casting solution containing about 23 wt.% cellulose acetate, 47 wt.% acetone solvent and 30 wt.% formamide pore producing agent were drop cast into the axial water passage bore of the above described module. During this membrane casting operation, the module was placed in a stationary vertical position. The casting solution was poured into the module bore. A casting bob having a circular cross-section at its widest point with an outside diameter between about 0.02 inch and 0.12 inch less than the inside diameter of the module bore was dropped down through the bore to form a continuous film of casting solution on the inside of each bore. The film was then allowed to air dry for about 30 seconds and then the entire module was immersed into a leaching bath containing ice water at about 1.5° C for about 30 minutes. This leached the acetone and formamide from the cast film and formed a porous, reverse osmosis membrane, containing a thin, active osmotic skin on the outside of the membrane structure, in the interior module bore.

Wet burst strength and dry compressive strength tests were run on the cured module. In the burst strength test, tap water was used. Fittings were clamped to each end of the module such that high water pressure could be directed through the central module bore. The water pressure was increased slowly on the test module until it failed. Failure was always in the form of a longitudinal crack centrally propagating one-sixth to one-third of the test section length. The average wet burst strength was 1,200 psi. This value is well within the usual 500 to 750 psi. operating pressures for reverse osmosis fluid purification systems.

During the wet burst strength test, purified water permeated through the cellulose acetate semipermeable membrane and the epoxy resin module wall. Thus, the module was both porous and strong and well suited to reverse osmosis applications.

Cylindrical specimens of the resin sand casting composition, about 2 inches high by 2 inches in diameter were cast, cured, machined to give two parallel faces, and compression tested at a 0.050 in./min. strain rate. The peak load was taken as the dry compressive strength. The average compressive strength was about 5,050 psi.

Using the same amount of resin formulation, the amount of sand filler was varied and similar tests run as described above. At 4.7 wt.% resin, wet burst strength values averaged, 1,310 psi. and compressive strength values averaged 3,700 psi. At 6.5 wt.% resin, wet burst strength values averaged 900 psi. and compressive strength values averaged 4,700 psi. At 9 wt.% resin, wet burst strength values averaged 1,500 psi. It was felt that use of smaller sand size, i.e. about 150 microns to 200 microns and better compaction of the resin-sand casting compositions in the tube by using a vibration techinque would produce even better results. Suitable perforated stainless steel tubing or porous resin coated glass fabric could optionally be used as an outer support for the reverse osmosis module.

We claim:

1. A method for making a rigid, hollow, porous module, having a semipermeable reverse osmosis membrane supported therein comprises the steps of:
   A. forming a 100 percent solids, solventless, latent catalyzed resin composition consisting essentially of an admixture of:
      1. one part of liquid epoxy resin,
      2. from about 0.75 to about 1.55 parts of liquid organic acid anhydride curing agent,
      3. from about 0.25 to about 0.95 part of liquid diepoxide reactive diluent, and
      4. an amount of a catalyst, selected from the group consisting of quaternary ammonium salts, quaternary phosphonium salts and quaternary arsonium salts, effective to provide a latent catalytic activity wherein the resin has a viscosity of below about 100 cp. at 25° C,
   B. mixing the solventless resin composition with a quantity of filler particles having a granular structure, so that the filler particles are coated with the resin, and wherein the resin constitutes from about 1 to 18 percent of the resin coated filler weight,
   C. casting the resin coated filler into a mold, the mold having a configuration effective to provide a cast structure having at least one interior axial bore therethrough, D. heating the mold containing the cast contacting resin coated filler to cure the resin and bond adjacent resin coated filler particles together, E. cooling the mold and removing the cast structure to provide a porous, strongly consolidated module of bonded resin coated filler particles having at least one axial bore therethrough and a wet burst strength of at least 250 psi., and F. casting a semipermeable reverse osmosis membrane in the interior axial bores of the module.

2. The method of claim 1, wherein from about 0.0001 to about 0.0025 part of quaternary latent catalyst is used and the resin has a shelf life of at least 60 days.

3. The method of of claim 1, wherein the filler has an average particle size of between about 40 microns and about 500 microns and the latent catalyst is a quaternary phophonium salt.

4. The method of claim 3, wherein the filler is sand, the liquid epoxy resin is selected from the group consisting of diglycidyl ether of bis-phenol A epoxy resins, cycloaliphatic epoxy resins, acyclic aliphatic epoxy resins, heterocyclic glycidyl amine epoxy resins, and glycidyl ester epoxy resins, the diepoxide reactive diluent has a viscosity of between about 2 cp. and about 50 cp. at 27° C and an epoxy equivalent weight of between about 100 and about 250 and the latent catalyst is a quaternary phosphonium salt.

5. The method of claim 4, wherein the resin constitutes about 4 to from about 32 volume percent of the porous module and the semipermeable membrane is a cellulose acetate membrane.

6. The method of claim 5, wherein, in step (F) a cellulose acetate solution is placed in the module bore, a casting bob having a circular cross-section is dropped down the bore to form a film of cellulose acetate solution on the inside of each bore, said film then being leached with water to form a reverse osmosis membrane.

7. A rigid, hollow, porous, strongly consolidated reverse osmosis membrane support module having a wall containing bonded, resin coated filler, wherein the resin is the cured reaction product of a 100% solids, solventless, latent catalyzed epoxy resin composition consisting essentially of:

1. one part of liquid epoxy resin,
2. from about 0.75 to about 1.55 parts of liquid organic acid anhydride curing agent,
3. from about 0.25 to about 0.95 part of liquid diepoxide reactive diluent, and
4. from about 0.0001 to about 0.0025 part of a latent catalyst selected from the group consisting of quaternary ammonium salts, quaternary phosphonium salts and quaternary arsonium salts, wherein the resin constitutes from about 1 to about 18 percent of the resin coated filler weight, the filler comprises particles having a granular structure and an average particle size between about 40 microns and about 500 microns, the inside of said wall supporting a reverse osmosis membrane.

8. The module of claim 7, wherein the filler is sand, the liquid epoxy resin is selected from the group consisting of diglycidyl ether of bis-phenol A epoxy resins, cycloaliphatic epoxy resins, acyclic aliphatic epoxy resins, heterorcyclic glycidyl amine epoxy resins, and glycidyl ester epoxy resins, the diepoxide reactive diluent has a viscosity of between about 2 cp. and about 50 cp. at 27° C and an epoxy equivalent weight of between about 100 and about 250 and the latent catalyst is a quaternary phosphonium salt.

9. The module of claim 8 wherein the resin constitutes about 4 to from about 32 volume percent of the porous module, the semipermeable membrane is a cellulose acetate membrane and the module has a set burst strength of at least 750 psi.

10. The module of claim 9 surrounded by a tubular outside support selected from perforated metal and resin coated fabric.

* * * * *

UNITED STATES PATENT OFFICE
CERTIFICATE OF CORRECTION

Patent No. 4,076,626  Dated February 28, 1978

Inventor(s) J. F. Meier and J. D. B. Smith

It is certified that error appears in the above-identified patent and that said Letters Patent are hereby corrected as shown below:

Column 1, line 29, "would" should be
-----wound-----

Column 4, line 39, between the words readily and to insert the words -----available in commercial quantities and reference may be made-----

Signed and Sealed this

Fifteenth Day of August 1978

[SEAL]

Attest:

RUTH C. MASON
Attesting Officer

DONALD W. BANNER
Commissioner of Patents and Trademarks